(12) United States Patent
Oravec et al.

(10) Patent No.: US 12,433,358 B2
(45) Date of Patent: Oct. 7, 2025

(54) DISPOSABLE GLOVES AND METHODS OF USING AND MAKING

(71) Applicant: Medline Industries, LP, Northfield, IL (US)

(72) Inventors: Evan Oravec, Riverwoods, IL (US);
Katie MacLeod, Lisle, IL (US);
Margaret Stephens, Wildwood, IL (US)

(73) Assignee: Medline Industries, LP, Northfield, IL (US)

( * ) Notice: Subject to any disclaimer, the term of this patent is extended or adjusted under 35 U.S.C. 154(b) by 0 days.

(21) Appl. No.: 17/903,440

(22) Filed: Sep. 6, 2022

(65) Prior Publication Data
US 2023/0049299 A1 Feb. 16, 2023

Related U.S. Application Data

(62) Division of application No. 16/209,528, filed on Dec. 4, 2018, now abandoned.

(Continued)

(51) Int. Cl.
| | |
|---|---|
| *A41D 19/00* | (2006.01) |
| *A41D 13/12* | (2006.01) |
| *A41D 19/04* | (2006.01) |
| *A61B 17/00* | (2006.01) |
| *A61B 42/10* | (2016.01) |

(Continued)

(52) U.S. Cl.
CPC ..... *A41D 19/0048* (2013.01); *A41D 13/1209* (2013.01); *A41D 19/0003* (2013.01); *A41D 19/0006* (2013.01); *A41D 19/001* (2013.01);
*A41D 19/0058* (2013.01); *A41D 19/0075* (2013.01); *A41D 19/043* (2013.01); *A61B 42/10* (2016.02); *A61B 42/40* (2016.02); *B05D 1/18* (2013.01); *B05D 3/107* (2013.01); *B05D 7/02* (2013.01); *B29C 41/00* (2013.01); *A41D 19/0062* (2013.01); *A41D 2400/52* (2013.01); *A61B 2017/00526* (2013.01); *B05D 3/0272* (2013.01)

(58) Field of Classification Search
CPC ............ A41D 19/0048; A41D 19/0003; A41D 19/0006; A41D 19/001; A41D 19/0058; A41D 19/0075; A41D 19/043; A41D 13/1209; A41D 2400/52
See application file for complete search history.

(56) References Cited

U.S. PATENT DOCUMENTS

| | | | |
|---|---|---|---|
| 7,579,028 B1 * | 8/2009 | Cheng ................. | A61K 36/886 521/65 |
| 2003/0226191 A1 * | 12/2003 | Modha .................. | A61B 42/00 2/161.7 |

(Continued)

*Primary Examiner* — Uyen T Nguyen
(74) *Attorney, Agent, or Firm* — Fitch, Even, Tabin & Flannery LLP

(57) ABSTRACT

A disposable glove and a method for making the disposable glove that reduces or eliminates glove cuff roll-down. The disposable glove includes a treated area on the interior surface of the glove that extends from the hand area to a portion of the wrist-forearm area of the glove but such that at least a portion of the interior near the glove opening is untreated. The untreated portion of the interior surface of the disposable glove resists glove cuff roll-down when the glove is positioned on a user's hand and forearm.

11 Claims, 4 Drawing Sheets

Related U.S. Application Data

(60) Provisional application No. 62/608,903, filed on Dec. 21, 2017.

(51) Int. Cl.
  *A61B 42/40* (2016.01)
  *B05D 1/18* (2006.01)
  *B05D 3/02* (2006.01)
  *B05D 3/10* (2006.01)
  *B05D 7/02* (2006.01)
  *B29C 41/00* (2006.01)

(56) References Cited

U.S. PATENT DOCUMENTS

| | | | |
|---|---|---|---|
| 2004/0036196 A1* | 2/2004 | Conley | B29C 41/22 264/307 |
| 2004/0231028 A1* | 11/2004 | Triebes | A41D 31/185 2/161.7 |
| 2006/0059604 A1* | 3/2006 | Lai | B29C 41/14 2/168 |
| 2006/0191056 A1* | 8/2006 | Bottcher | A41D 19/015 2/159 |
| 2006/0218697 A1* | 10/2006 | Modha | A61B 42/00 2/161.7 |
| 2006/0222688 A1* | 10/2006 | Weiss | A41D 19/0058 424/443 |
| 2008/0034467 A1* | 2/2008 | Chou | A41D 31/12 2/159 |
| 2009/0035447 A1* | 2/2009 | Bottcher | A41D 19/015 427/2.3 |
| 2010/0050317 A1* | 3/2010 | Day | A61B 42/10 2/167 |
| 2011/0191936 A1* | 8/2011 | Lipinski | C08L 13/02 264/130 |
| 2015/0329275 A1* | 11/2015 | Silkaitis | B65D 75/54 206/278 |
| 2016/0183611 A1* | 6/2016 | Dangalla | A41D 31/26 2/168 |
| 2017/0071271 A1* | 3/2017 | Megat Abdul Aziz | A41D 19/001 |

* cited by examiner

Process Flow Diagram

DISPOSABLE GLOVES AND METHODS OF USING AND MAKING

CROSS-REFERENCE TO RELATED APPLICATION(S)

This application is a divisional of U.S. application Ser. No. 16/209,528, filed Dec. 4, 2018, which claims the benefit of U.S. Provisional Application No. 62/608,903, filed Dec. 21, 2017, each of which are incorporated by reference in their entirety herein.

TECHNICAL FIELD

This disclosure relates generally to disposable gloves and methods of using and making these gloves.

BACKGROUND

Disposable medical gloves are widely used as a protective measure and have become mandatory in many industries and nearly all medical settings. In particular, disposable gloves are required as a means for protecting medical staff from coming into contact with bodily fluids during surgical procedures and cleanup thereof, medical examinations, laboratory testing, and other medical procedures. Disposable gloves have traditionally been made of rubber materials such as latex, thermoplastic materials such as vinyl, and other natural and synthetic materials. Often the gloves have a coating on the interior surface of the disposable gloves to make donning of the gloves easier. Coatings have largely replaced powder in disposable gloves to reduce the occurrence of allergic reactions to the powder by users of the gloves.

In addition to gloves, medical staff must also wear other protective garments, such as medical or surgical gowns to protect them from coming into contact with bodily fluids. For example, such a gown is typically worn over the torso and arms of medical staff members during cleanup of medical equipment that has been used in a surgical procedure. Disposable gloves may then be placed on the hands and forearms of the individual, while a portion of the glove is placed over the sleeve of the gown to ensure that no portion of the individual's arm or hand is exposed.

Gowns worn by cleaning personnel typically are manufactured of materials such as blends of polyester, polypropylene and polyethylene. Gowns manufactured from these materials are generally more slippery than surgical gowns of the past that were made out of cloth fabrics.

The use of these materials in gowns worn by cleaning personnel, in combination with the use of disposable gloves having coatings on the interior surfaces of the gloves, has produced problems for medical staff. Specifically, as coated disposable gloves are placed over the sleeves of existing gowns, the inner surface of the coated disposable gloves contacts the slippery outer surface of the gown and causes the gloves to roll down the arm or the wrist-forearm of the gown. This problem, often referred to as glove cuff roll-down, permits the possibility of contamination due to partial exposure of the individual's arm.

The present invention addresses this problem by providing gloves and methods of making gloves that reduce the occurrence of glove cuff roll-down, and cleaning methods involving such gloves.

Figure 1:
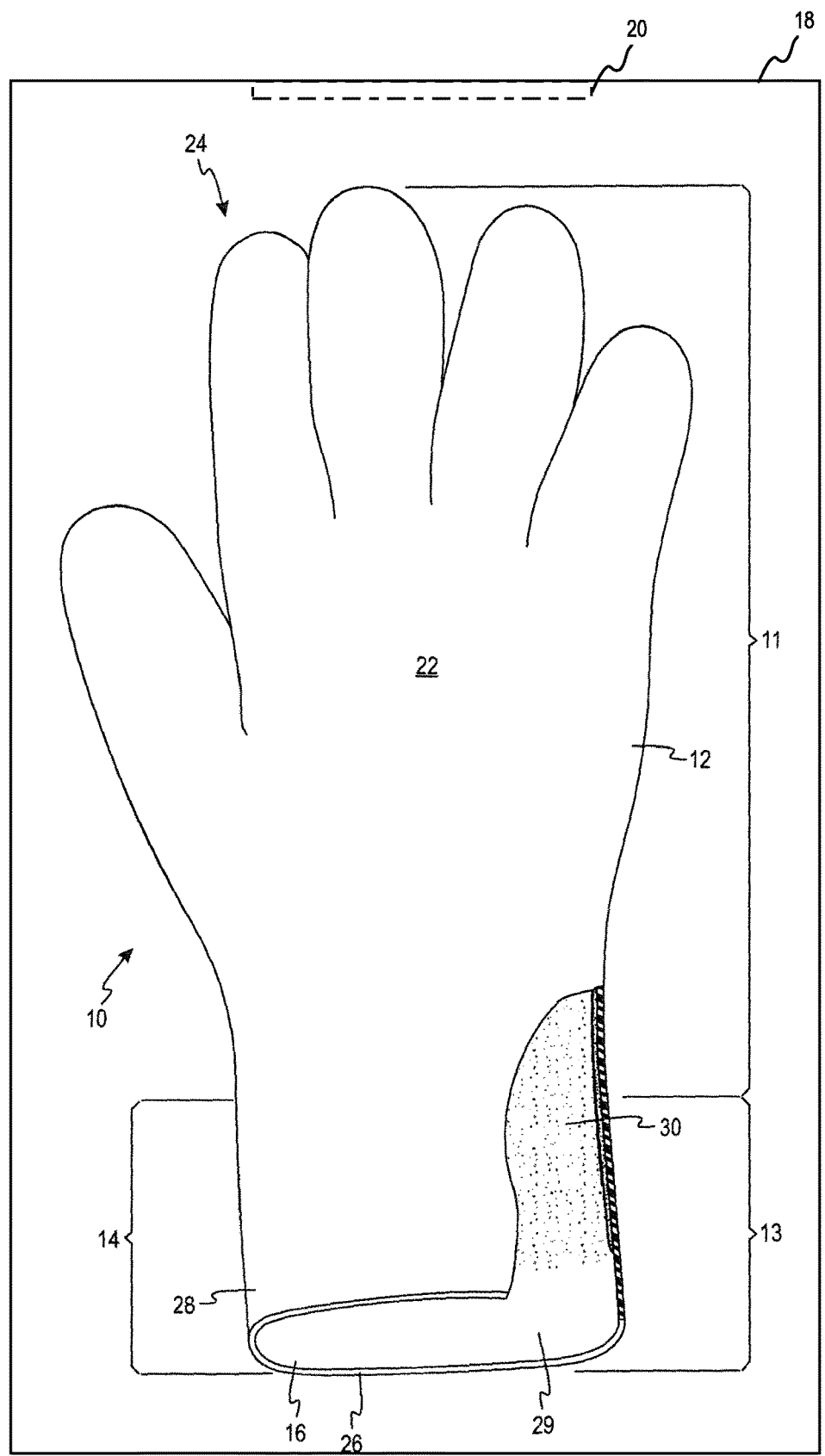
FIG. 1 is a perspective view of an exemplary disposable glove with a cut-away portion of the wrist-forearm area.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments.

DETAILED DESCRIPTION

Generally speaking, a disposable medical glove includes a flexible body with a first area and a second area. The first area includes a palm and back area that can be disposed adjacent either the palm or back of the hand and a plurality of finger-receiving receptacles. The second area includes a wrist-forearm area. The wrist-forearm area includes a cuff portion and may include a beaded cuff. In an exemplary configuration, the disposable glove is composed of a nitrile material and has a chlorinated coating that is only partially disposed on the interior surface of the disposable glove. The partial coating on the interior surface of the disposable glove covers the first area and a portion of the second area such that, for example, the beaded cuff and the cuff portion are uncoated and resistant to glove cuff roll-down.

The gloves may be universally handed such that a user may wear the same glove on either hand. In other words, the palm or back area or the middle body of the glove is configured such that it can be comfortably and effectively worn adjacent a palm of a user or the back of a user's hand without a defined configuration for one hand or the other.

The flexible body of the disposable medical examination glove is formed of one or more synthetic latex materials, such as, for example, nitrile. The gloves are made by dipping formers, such as ceramic formers, into one or more baths of uncured nitrile material, and then subsequently, dipping the same formers into tanks containing a chlorine solution. When the nitrile-dipped formers are dipped into the chlorine tank, unsaturated bonds in the nitrile material react with the chlorinated coating to form a more slippery, less tacky surface than the uncoated nitrile surface. This surface facilitates donning of the gloves. By not applying the chlorine solution at and near the opening of the glove such that a cuff portion of the glove remains untreated, the nitrile remains unbonded, such that the cuff portion of the resulting glove has a relatively increased tackiness. This provides a higher coefficient of friction between the glove and the surface with which that portion of the glove interacts, such as, the gown sleeve.

The method for making such disposable gloves generally comprises forming the disposable glove on a ceramic former. The disposable glove includes a first area and a second area. The first area includes a palm-hand area and a plurality of finger-receiving receptacles. The second area includes a wrist-forearm area. The method comprises dipping the disposable glove into a chlorinating solution coating such that the palm-back area and a portion of the wrist-forearm area react with the chlorine to form a lower-friction surface and a portion of the wrist-forearm area remains uncoated. The method further comprises removing the disposable glove from the former by inverting the disposable glove so that the lower-friction surface is disposed on an interior surface of the disposable glove. The uncoated portion of the wrist-forearm area reduces glove cuff roll-down when the disposable glove is worn by a user.

A method for using the glove includes donning a medical gown, placing a first hand into a first universally-handed disposable glove as described herein above, placing a second hand into a second universally-handed disposed glove, disposing an uncoated, upper portion of the first and second universally-handed disposable gloves over sleeves of the medical gown, and cleaning soiled medical tools or supplies. The gloves alternatively may be used for medical examination purposes, or for other purposes where contamination or soiling of the hands is to be avoided.

The gloves may be sold in bulk with more than two gloves per package, for instance 10, 25, or 50 gloves per package. This is in contrast to typical surgeon's gloves, which have a pre-defined handedness and which are typically sold in pairs. Any suitable package 18 may be provided. For example, the package 18 may comprise a cardboard box having a tear-away cardboard cutout 20 disposed therein, through which individual ones of the multiple universally-handed gloves is withdrawn for use. In this manner, a user may pull any two of the multiple gloves through an opening through the cardboard box and don them for use.

Figure 4:
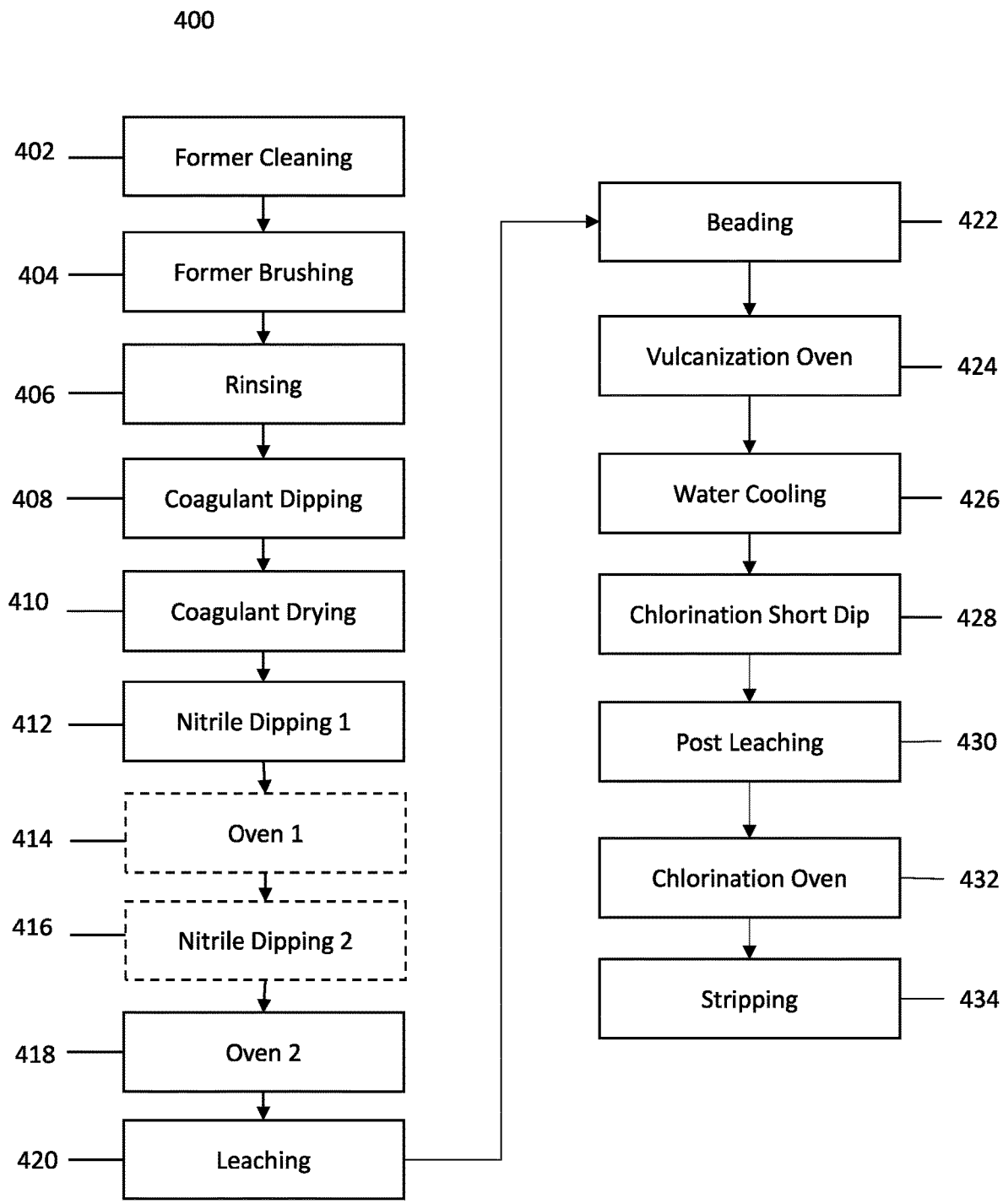
FIG. 4 comprises a flow diagram illustrating steps in a method for preparing gloves of the type shown in FIG. 1.

The process 400 illustrated in FIG. 4 may be employed to make a disposable glove 10 having a flexible body formed of nitrile that is partially treated with chlorine with an untreated area disposed adjacent the glove opening. The process 400 includes cleaning 402 a ceramic former, brushing 404 the ceramic former, and rinsing 406 the ceramic former. Subsequently, the process 400 comprises dipping 408 the former in a coagulant and then drying 410 the coagulant. At step 412, the former is dipped into a tank of solution, and then, at step 414, the former is placed in an oven. An optional second nitrile dipping step 416 and oven step 418 may follow the first. The former undergoes a leaching process 420, a beading process 422, and a vulcanization process 424. In step 416, the ceramic former and the flexible body of the glove disposed thereon undergo water cooling. These steps are typical of known glove-forming processes.

After the cooling step 426, the ceramic former undergoes a chlorination step 428. The chlorination dipping step 428 is a short dip, as compared to the nitrile dip, which means that the chlorine does not cover the entire surface of the nitrile glove. The short chlorination dip 428 may be accomplished by lowering the ceramic former a shorter distance than it was lowered into the nitrile tank or the chlorine tank may be lowered the length of the desired short dip. By one approach, the short-dip process described herein coats the interior surface of the glove leaving about 3-in. to about 4-in. of cuff uncoated at the opening of the disposable glove. Non-limiting examples of a suitable solution for use in the tank for the chlorination dip 428 include a chlorine gas diluted in water, such that the chlorine concentration is in a range of between about 500 ppm to about 800 ppm. After the short chlorination dip, the process 400 includes post leaching 430 and a chlorination oven step 432. The process 400 also includes stripping 434 a formed disposable glove 10 from the ceramic former.

The disposable glove 10 shown in FIG. 1 comprises a hollow flexible body article having a first area 11 and a second area 13. The first area 11 includes a hand area 12. The second area 13 includes and a wrist-forearm area 14. The disposable glove 10 has an open end 16 into which a hand is inserted. The hand area 12 includes a palm and back area 22 and a plurality of finger-receiving receptacles 24. Unlike surgeon's gloves, the disposable gloves 10 described herein are universally handed such that the palm-back area 22 may be worn adjacent either the palm or the back of the hand. The wrist-forearm area 14 includes a beaded cuff 26 and a cuff portion 28.

The ASTM D6319 requires that nitrile examination gloves be at least 1.97 mil (measured as a single wall thickness) or 0.05 mm at the finger and at the palm. The thickness of the disposable glove 10 may range from about 1.97 mil thickness to about 13 mil thickness (measured as a single wall thickness). In one illustrative configuration, the thickness of the disposable glove 10 (measured as a single wall thickness) is about 5.5 mil to about 13 mil.

The wrist-forearm area 14 of FIG. 1 has been cutaway to show the interior surface 29 of the disposable glove 10. A portion of the interior surface 29 of the disposable glove 10 includes a treated surface 30 formed by chlorination as described above.

This surface 30 is particularly appropriate for disposable gloves intended for cleaning medical devices or tools. The glove may have a length of about 16-inches with 3-4 inches of the glove remaining untreated.

The partially-treated gloves 10 were compared to nitrile gloves with a completed treated interior in a study where the objective was to assess if the nitrile glove partially-treated with chlorine could reduce the amount the glove "rolls-down" from its initial position on the arm during use. During the study, participants donned either a set of partially-treated nitrile gloves or a set of completely treated nitrile gloves and washed surgical equipment for ten minutes. The top position of the gloves was measured for each arm before and after washing the equipment. Participants then repeated this procedure with the other glove type; the order of the gloves was randomly assigned. The partially-treated glove demonstrated about 38% less roll-down as compared to the glove with an interior surface entirely treated with chlorine (a roll down of 35.1 mm was measured for a partially-treated set of gloves as opposed to a roll down of 57.2 mm for a fully-treated set of gloves).

It is contemplated that the treated surface 30 may be disposed on different portions of the interior surface 29 of the disposable glove 10 other than the portions shown in FIG. 1. The location of the treated surface on the interior surface 29 of the disposable glove 10 are features that may be modified based on cost considerations, the desired level of donnability of the disposable glove 10, ease of application of the coating, production capabilities, etc.

In addition to the treated surface 30 described above, the disposable glove 10 may also be coated with other substances that add to the performance of the disposable glove 10, such as aloe, moisturizers, anti-bacterial agents, anti-fungal agents or combinations thereof.

Figure 2:
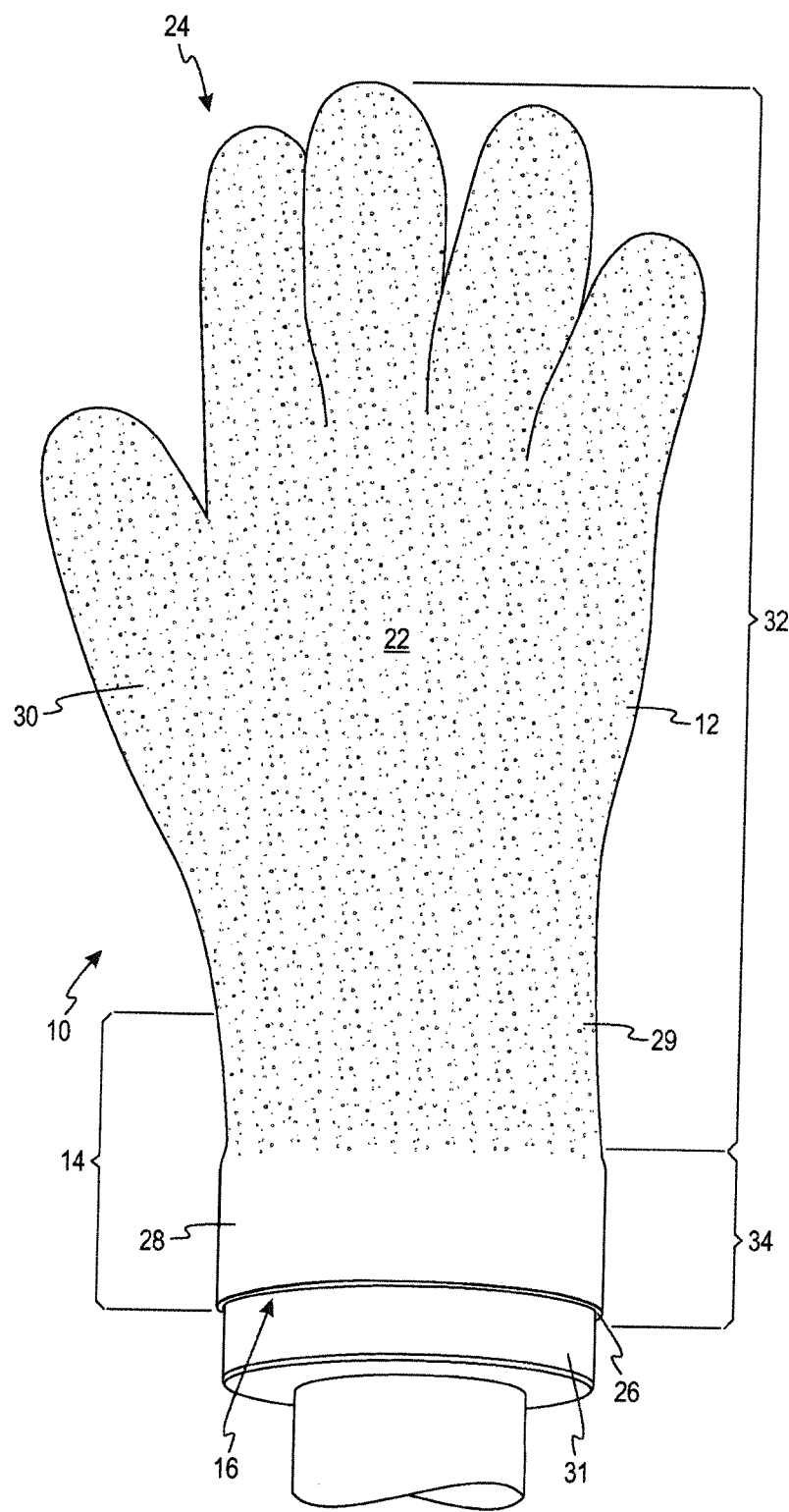
FIG. 2 is a perspective view of the disposable glove of FIG. 1 prior to being stripped from its former.

With reference to FIG. 2, while on the former 31, the interior surface 29 of the disposable glove 10 is exposed. As shown in FIG. 2, according to one embodiment, a selected portion 32 of the interior surface 29 is treated with a chlorinated solution beginning from the finger-receiving receptacles 24 extending to and including a portion of the wrist-forearm area 14. However, a portion 34 of the interior surface 29 that includes the beaded cuff 26 and the cuff portion 28 is not coated or is at least substantially not coated. In other words, while the embodiments of the present invention described herein include a disposable glove 10 having a portion 34 of the interior surface 29 that is not treated (namely the beaded cuff 26 and the cuff portion 28), it is possible that a small area(s) of the beaded cuff 26 and the cuff portion 28 may contain a nominal amount of chlorination due to, for example, slight variances in the dipping process.

The uncoated or substantially untreated portions 34 of the interior surface 29, namely the beaded cuff 26 and the cuff portion 28, help to reduce or eliminate the occurrence of glove cuff roll-down. Glove cuff roll-down occurs when the interior surface 29 of the disposable glove 10, which is at least partially coated, comes in contact with the sleeve material of the medical gown, surgical gown or other protective garment and, due to the slippery nature of the coating and the material used in the gown or other protective garment, causes the gown or other protective garment to slide down the arm or wrist-forearm of a user. Although not intending to be bound by the particular theory or theories disclosed herein, it is believed that the reduction or elimination of glove cuff roll-down is achieved because the interior surface of the disposable gloves made from natural rubber latex and/or synthetic rubber materials is tacky when exposed in an uncoated state. The tacky portion, namely the untreated or substantially untreated portion 34, of the disposable glove 10 is believed to grip the gown sleeves and the gown/protective garment material more effectively.

Figure 3:
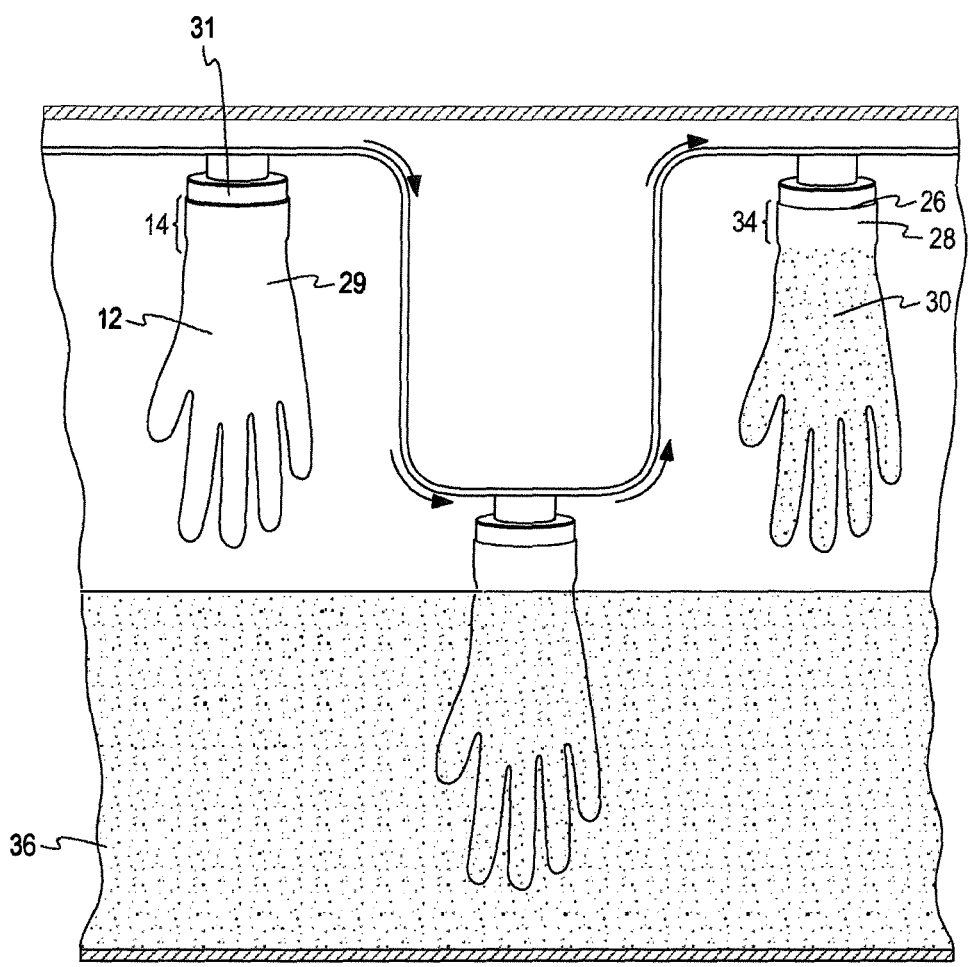
FIG. 3 comprises a diagrammatic representation of the apparatus used to carry out the method for making the disposable glove of FIG. 1.

Turning to FIG. 3, the former 31 hand is dipped into a first tank of nitrile or other suitable glove-forming material(s) (not shown). In some embodiments, the former 31 may be dipped a second or more times into the first tank of nitrile or other suitable glove-forming material(s) to reinforce the disposable glove 10 as it is formed on the former 31. It is also contemplated that the former 31 could be dipped one or more times into additional glove-forming tank(s). The number of dips or the types of material(s) in the tank(s) may depend on cost considerations, the desired level of donnability of the disposable glove 10, ease of application of the coating, production capabilities, etc. The former 31 containing the nitrile or the other suitable glove-forming material(s) formed by this dipping process may then be cured to form the disposable glove 10 having a hand area 12 and a wrist-forearm area 14. At this point, the disposable glove 10 is in an inverted position on the former 31, with the interior surface 29 of the disposable glove 10 exposed.

The disposable glove 10 formed by the dipping process as described above is, in one embodiment, then dipped into a tank containing a chlorinated solution 36 as shown in FIG. 3 such that less than all of the disposable glove 10 is immersed in the tank containing the solution 36. Non-limiting examples of suitable materials for use in the treatment tank include, for example, a chlorine gas diluted in water in a particular concentration such that the gloves, on the former, are dipped into a liquid chlorine solution. By one approach, the chlorine in the tank is present in the range of between about 500 ppm to about 800 ppm.

After the dipping stage shown in FIG. 3, the disposable gloves 10 are inverted so that the treated surface 30 is on the inside of the disposable glove 10 as depicted in FIG. 1. The disposable gloves 10 are then stripped off of the production line, and then sorted, cleaned/washed, processed, packed, inspected and/or sterilized. The resulting disposable gloves 10 possess improved functional characteristics which permit users to wear the disposable gloves 10 with surgical gowns or other protective garments without suffering from problems relating to glove cuff roll-down.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed:

1. A method of making a disposable glove comprising:
    forming an untreated glove on a former;
    dipping a portion of the untreated glove on the former into a solution of chlorine gas diluted in water to yield a partially treated glove such that a first region of the untreated glove proximal finger-receiving receptacles of the untreated glove is treated with chlorine and a second region of the untreated glove proximal a wrist and forearm section of the untreated glove is untreated with chlorine, wherein the first region of the partially treated glove has a relatively lower-friction surface compared with the second region of the partially treated glove that remains untreated to thereby retain a higher level of tackiness relative to the first region of the partially treated glove;
    removing the partially treated glove from the former with the second region of the partially treated glove being uncoated with any other substances such that the second region of the partially treated glove is exposed;
    inverting the partially treated glove so that the portion comprises a portion of an interior surface; and
    inserting the partially treated glove having the untreated and uncoated second region in a package.

2. The method of claim 1 wherein the former is universally handed such that the partially treated glove is universally handed.

3. The method of claim 1 wherein the wrist section includes a beaded glove portion.

4. The method of claim 1 wherein a concentration of the chlorine gas is in a range of 500 ppm to 800 ppm.

5. The method of claim 1, wherein the forming of the untreated glove comprises dipping the former into a tank of uncured nitrile.

6. The method of claim 1, wherein the forming of the untreated glove comprises dipping the former into a tank of uncured nitrile multiple times, wherein the wrist section includes a beaded glove portion, and wherein a concentration of the chlorine gas is in a range of 500 ppm to 800 ppm.

7. The method of claim 5 wherein the forming of the untreated glove comprises dipping the former into the tank of uncured nitrile multiple times.

8. A package of disposable medical gloves comprising a container and a plurality of disposable gloves packed in the container;
 individual disposable gloves of the plurality of disposable gloves including a first region treated with chlorine gas diluted in water and a second region that is untreated with chlorine gas diluted in water and uncoated with any other substances, the second region has a relatively higher-friction surface compared with the first region to thereby retain a higher level of tackiness relative to the first region.

9. The package of claim 8, the individual disposable gloves comprising a nitrile material.

10. The package of claim 8, the individual disposable gloves having a thickness ranging from about 5.5 mil to about 13 mil.

11. The package of claim 8, wherein the individual disposable gloves include a beaded glove portion.

\* \* \* \* \*